No. 775,236. PATENTED NOV. 15, 1904.
W. CHAMBERS.
HANDLE ATTACHMENT.
APPLICATION FILED JULY 1, 1904.
NO MODEL.
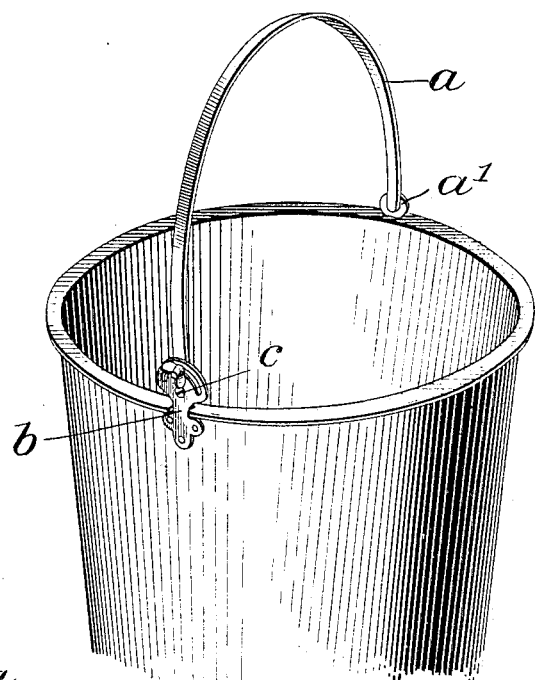
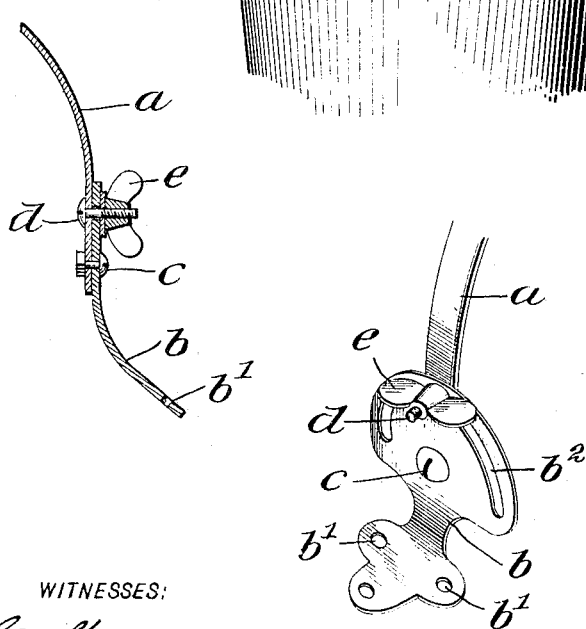
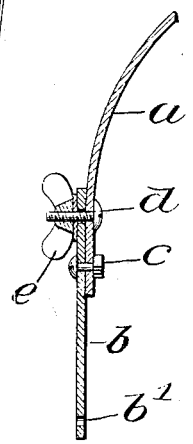
WITNESSES:
INVENTOR
William Chambers
BY
ATTORNEYS No. 775,236. Patented November 15, 1904.

UNITED STATES PATENT OFFICE.

WILLIAM CHAMBERS, OF CHICAGO, ILLINOIS.

HANDLE ATTACHMENT.

SPECIFICATION forming part of Letters Patent No. 775,236, dated November 15, 1904.

Application filed July 1, 1904. Serial No. 214,882. (No model.)

*To all whom it may concern:*

Be it known that I, WILLIAM CHAMBERS, a citizen of the United States, and a resident of Chicago, in the county of Cook and State of Illinois, have invented a new and Improved Handle Attachment, of which the following is a full, clear, and exact description.

My invention relates to improvements for attaching handles to pots, kettles, and utensils of various kinds. It is especially adapted for use on those receptacles which have to be heated and which have a pivoted bail or handle that hangs down in contact with the receptacle while it is being heated. The bail or handle quickly becomes heated when in such a position; and it is the object of my invention to remedy this undesirable state of affairs.

My invention comprises a member secured to the body of the receptacle and means for securing the handle to the member in adjusted position. It may be embodied in many forms, one of which is illustrated in the accompanying drawings, which form a part of this specification, and in which similar characters of reference indicate corresponding parts in all the figures.

Referring to the drawings, Figure 1 is a perspective view showing a receptacle provided with a preferred form of the invention. Fig. 2 is a sectional view of a portion of the bail and of the member upon which it is mounted. Fig. 3 is a sectional view similar to Fig. 2, showing a slight modification to enable it to be attached to vessels having sloping sides; and Fig. 4 is a perspective view of the modification shown in Fig. 3.

$a$ represents the bail, which may be pivoted to the receptacle on one side, as at $a'$, and on the other side may be connected to a member $b$. This member is provided with perforations $b'$ or other equivalent devices for the purpose of enabling it to be secured to the receptacle. The bail is pivoted to the member $b$ by means of a stud, screw, bolt, or the like, (represented by $c$.) The bail therefore has pivotal motion about the points $c$ and $a'$.

The member $b$ is provided with a semicircular slot $b^2$, described about the pivot $c$ as a center, and the bail is provided with a bolt or screw $d$, projecting therefrom through the slot $b^2$ and provided with a thumb-nut $e$ or similar fastening device. It will be readily observed that the bail $a$ may be swung about its pivots in the same way as bails ordinarily constructed can be moved and that the bolt or screw $d$ will move along the curved slot $b^2$ with the bail. Furthermore, when the bail is placed in any desired position the thumb-nut $e$ can be tightened, which will secure the bail in that position, and consequently when the vessel is heated the bail can be placed in an upright or inclined position, so that it will not come into contact with the sides of the vessel. This will prevent the excessive heating of the bail, which is such an objectionable feature with many kinds of utensils. Furthermore, if the bail is desired to be secured in an upright position or at any incline for any purpose whatsoever, as for convenience in pouring out the contents of a receptacle or the like, the means illustrated in the drawings is a convenient form for accomplishing this result.

It will be obvious that the invention may be embodied in many other forms and that it is not limited to those illustrated in the drawings and described. It will also be obvious that the uses are many and that it will not be necessary to name all the kinds of receptacles and the like to which it may be applied.

Having thus described my invention, I claim as new and desire to secure by Letters Patent—

1. A handle attachment comprising a member adapted to be secured to a receptacle or the like, means for movably mounting a handle thereon, and a thumb-screw for securing the handle to the member in adjusted position at any desired angle thereto.

2. The combination of a handle and an attachment therefor, comprising a member adapted to be secured to a receptacle or the like, means for pivotally mounting one end of the handle on said member, and means for securing the handle to the member in any desired position to prevent pivotal motion of the handle with respect to the member.

3. The combination of a handle and an attachment therefor, comprising a member adapted to be secured to a receptacle or the like and having an arcuate slot, means for pivotally attaching the handle to the member, and means on the handle and entering said slot, for securing the handle at different angles with respect to the member.

4. The combination of a receptacle, a handle pivoted thereto at one side of the receptacle, a member secured to the other side of the receptacle, said member having a semicircular slot and a perforation at the center thereof, means for pivotally attaching the handle to said member through said perforation, a bolt secured to the handle and passing through said slot, and means for securing said bolt to the member at any desired point in the length of said slot.

In testimony whereof I have signed my name to this specification in the presence of two subscribing witnesses.

WILLIAM CHAMBERS.

Witnesses:
OTTO WORKING,
WM. W. BAKER.